Jan. 18, 1955  E. J. HOUDRY  2,699,989
CATALYTIC UNITS AND APPARATUS
Filed Oct. 4, 1950  3 Sheets-Sheet 1

INVENTOR.
EUGENE J. HOUDRY
BY
Ira L. Nickerson
ATTORNEY.

INVENTOR.
EUGENE J. HOUDRY
BY
Ira L. Nickerson
ATTORNEY.

Jan. 18, 1955  E. J. HOUDRY  2,699,989
CATALYTIC UNITS AND APPARATUS
Filed Oct. 4, 1950  3 Sheets-Sheet 3

INVENTOR.
EUGENE J. HOUDRY
BY
Ira L. Nickerson
ATTORNEY.

United States Patent Office 2,699,989
Patented Jan. 18, 1955

2,699,989

CATALYTIC UNITS AND APPARATUS

Eugene J. Houdry, Ardmore, Pa., assignor to Oxy-Catalyst, Inc., a corporation of Pennsylvania Application October 4, 1950, Serial No. 188,293

3 Claims. (Cl. 23—288)

This invention has to do with catalytic units and catalytic apparatus suitable for wide usage. A particular use is for the treatment of the exhaust gases of internal combustion engines for the purpose of effecting oxidation of burnable components in such gases and in accessory devices in the form of exhaust cleaners and mufflers for such engines. In certain respects the invention may be considered to represent improvements on or further development of the invention disclosed in my copending application Ser. No. 167,856 filed June 13, 1950.

Among the objects of the invention are to produce contact and catalytic units of extreme simplicity which give effective control of contacting reactions, to modify the form of catalyst units for effecting oxidation and other reactions, to hold catalyst elements securely in place in the catalyst unit and to mount such units entirely free of contact with adjacent catayslt elements thereby to avoid attrition and destruction of contact surfaces and areas, to devise catalyst units and apparatus therefor which are easy to manufacture and to assemble, and in general to provide improved forms and modified types of catalyst units and of containers therefor. Still other objects and advantages will be apparent from the detailed description which follows.

In accordance with the present invention the catalytic elements are attached to and extend from a single supporting member such as a disc or plate to form a catalytic unit. The elements may extend from one or from both sides of the supporting member. When they extend from one side of the support, the units may be mounted in pairs with the elements extending toward one another so as to span the interior of the container. To avoid channeling of exhaust gases or other fluids passing through the container, adjoining pairs of catalytic units may have elements of differing length disposed in a break joint arrangement and alternatively the elements in each pair of units may be of irregular lengths to effect a similar result. When the elements extend through or from both sides of the support, each unit may be arranged substantially to span the interior of its container. In the latter case the supporting discs or plates of the units are aligned down the center of the container forming a central wall. Apertured spacers may be interposed between adjacent supporting discs and at the ends of the container to permit free movement of gases and even distribution on both sides of the central wall.

In order to illustrate the invention and uses thereof, concrete embodiments of catalytic units and of apparatus for containing the same are shown in the accompanying drawings, in which.

Figure 1:
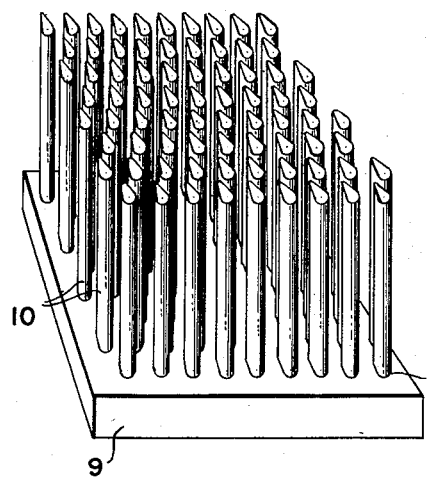
Fig. 1 is a perspective view of one form of catalyst unit.

Figure 1 shows in perspective a catalytic unit of ceramic or other suitable material comprising a supporting member or base 9 in the form of a disc or plate from one side of which extends a multiplicity of contacting or catalytic elements 10 which are impregnated or coated with any desired adsorptive or catalytic material. While elements 10 may be integral with support 9, it is preferred to provide support 9 with suitable recesses or slots $a$ into which elements 10 project and are secured at one end, as by glazing, cementing or in any other suitable manner.

As shown, the catalytic elements 10 are of teardrop or streamlined design in cross section, so that when gaseous or other fluids are directed through and over the elements in the direction in which said elements point, there will be smooth flow of the fluid and a minimum of back pressure. This construction is very desirable in certain operations where fast contact and little or no pressure changes are required, as in oxidizing reactions including treatment and purification of flue and exhaust gases. For operations requiring longer and delayed contact, the elements may be of different shape, as rounded, flattened, grooved, ridged, or otherwise fashioned to create turbulence, back pressure and prolonged time of contact. In any case, the recesses $a$ in supporting member 9 are formed to closely fit the contour and shape of elements 10 so that the latter will extend upwardly from base 9, preferably at right angles to the base and in parallelism with one another. To insure full contact of reactant fluids with catalytic elements 10, adjacent rows of the latter dispose the elements in staggered relation.

Figure 2:
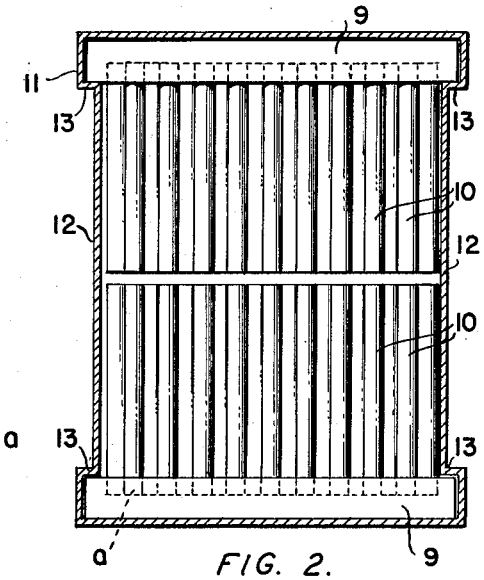
Fig. 2 is a transverse sectional view of a container showing two catalyst units mounted therein with their elements extending toward one another.
Figure 3:
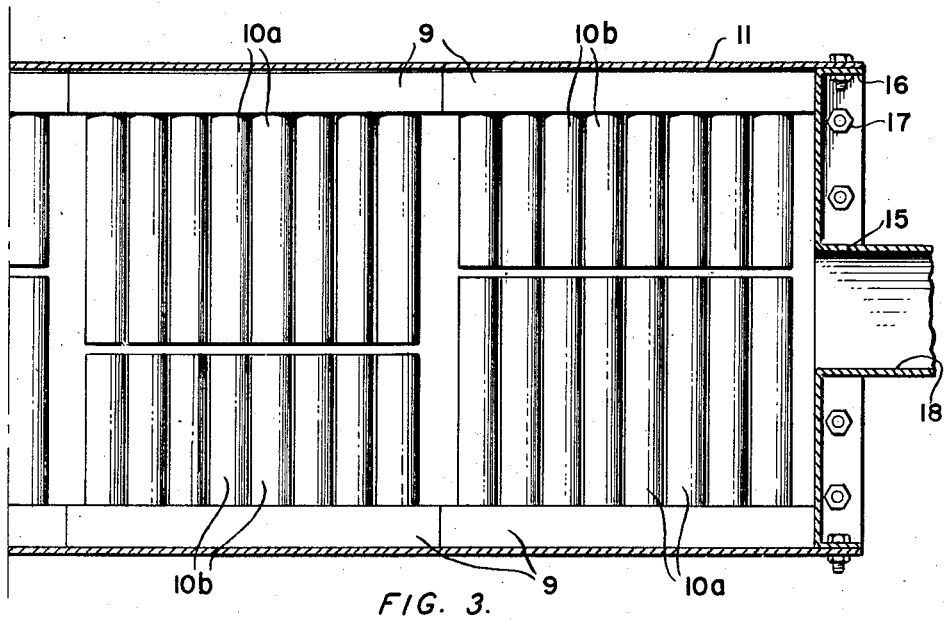
Fig. 3 is a longitudinal vertical sectional view of a container or muffler showing modified forms of the catalyst units in elevation mounted therein.

In the reactant chamber two units such as shown in Figure 1 may be mounted with the elements extending toward each other as in Figure 2 which shows a container 11 provided with opposed indented walls 12 to prevent lateral bypassing of fluids and to provide shoulders 13 adjacent to but spaced from the top and bottom of the container respectively to serve as retaining guides for slidably receiving supporting members 9. The catalytic units shown in Fig. 2 will be inserted into container 11 from an open end of the same, which open end may be closed by a member 15, Figure 3, provided with a flange 16 which fits within the open end of container 11 and is secured thereto in any suitable manner, as by a series of bolts 17. End member 15 may be formed with a central conduit or opening 18 for the ingress or egress of fluid.

While Fig. 3 shows the detail of an end closure for container 11 it also discloses modified forms of the catalytic unit, the supporting members or bases 9 conforming to that shown in Fig. 1, but the catalytic elements of each pair of complementary units are of different length, elements 10a of one unit being considerably longer than elements 10b of the complementary unit. When such catalytic units are mounted in adjacent pairs as in Fig. 3 there is reverse disposition of adjoining units of the adjacent pairs so that the gap between elements 10a and 10b of one pair will break joint with the gap between such elements of the next pair, thereby to avoid direct channeling of fluids passing through container 11.

Figure 4:
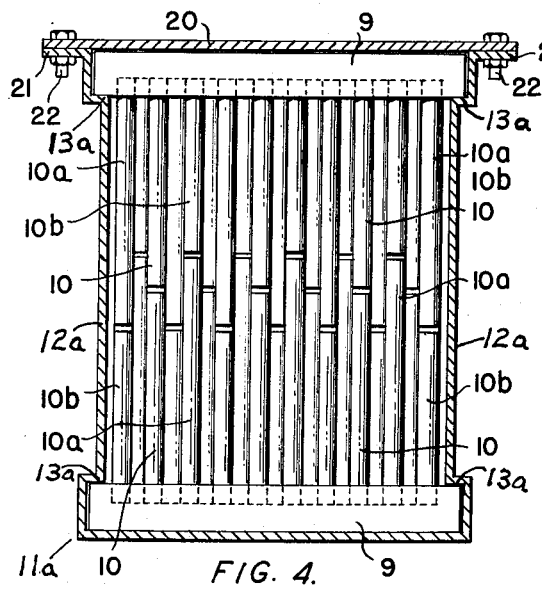
Fig. 4 is a transverse vertical sectional view taken on the line 4—4 of Fig. 5 and showing still another modification of the catalyst unit.
Figure 5:
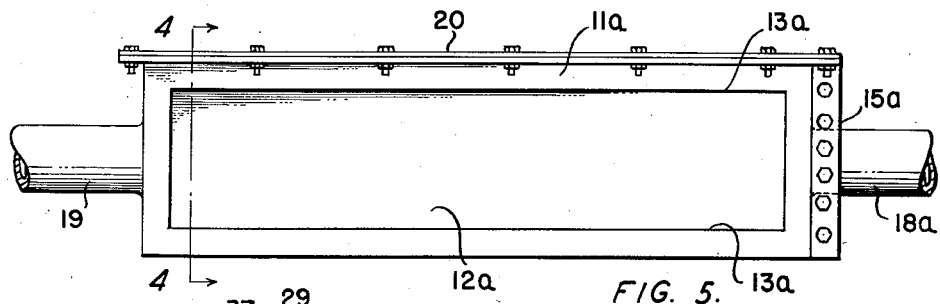
Fig. 5 is a side elevational view on a reduced scale of the muffler shown in Fig. 4.

Fig. 4 shows still another modification in which there is irregularity in the length of the catalytic elements in each of the units. Three different lengths of elements are shown for each unit, elements 10 conforming to the length of elements 10 in Figs. 1 and 2, and elements 10a and 10b conforming to the length of similarly designated elements in Fig. 3, with the result that when two of these modified catalytic units are mounted in opposed interfitting relation, as in Fig. 4, we have a series of alternating break joints both transverse and lengthwise of the pairs of units. The interfitting of the catalytic elements of pairs of end units requires the pairs to be assembled before insertion through the open end of the container. A preferred arrangement is to form container 11a with one removable end member 15a from which extends a conduit 18a, a similar conduit 19 projecting from the opposite closed end of container 11a, the side walls having depressed panels 12a to prevent bypassing of fluids along such walls and to form guide shoulders 13a for bases 9 of the catalytic units as in container 11 shown in Figs. 2 and 3, but to provide a removable top or cover plate 20 to rest upon flanges 21 projecting outwardly from the top of the side walls. Assembly can then be effected by sliding the catalytic units for the bottom of container 11a into place through the open end at the right of Fig. 5, which open end is then closed by end member 15a. The complementary upper units are then put in place through the open top of container 11a, whereupon cover plate 20 is applied and secured to flanges 21 as by bolts 22. The apparatus is then ready for use for an oxidizing or other catalytic operation, such for example as an exhaust cleaner and muffler for an internal combustion engine.

Figure 6:
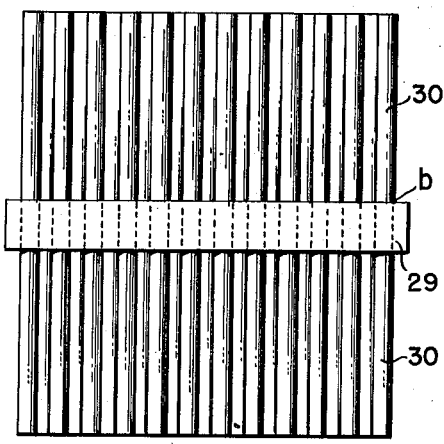
Fig. 6 is a side elevational view of still another modified form of catalyst unit.
Figure 7:
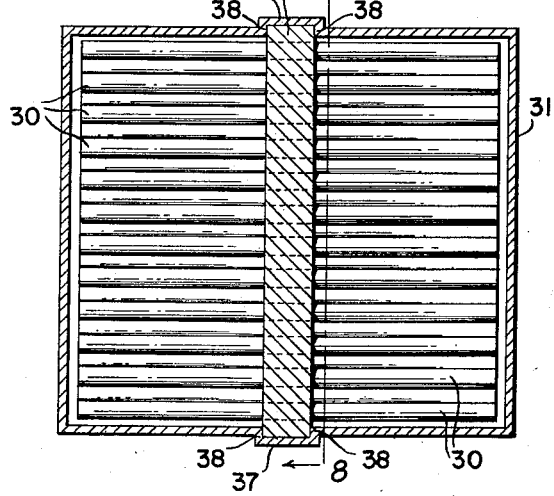
Fig. 7 is a transverse vertical sectional view on the line 7—7 of Fig. 8.
Figure 8:
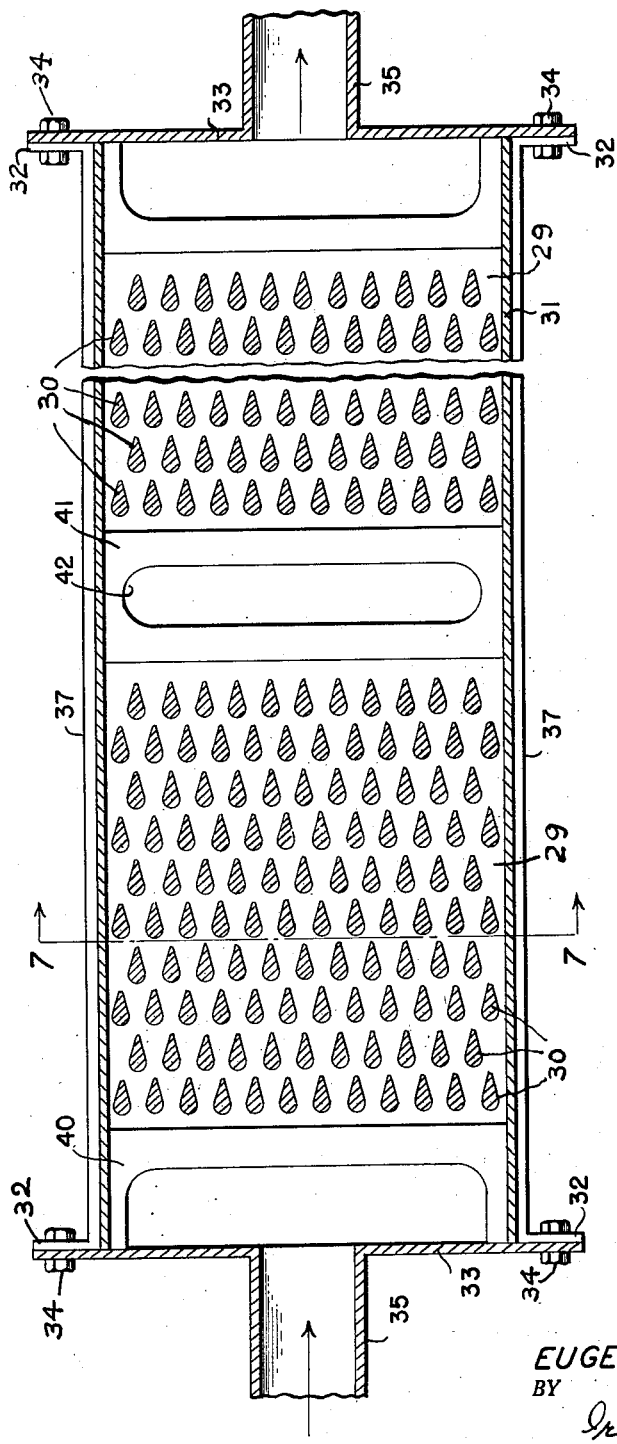
Fig. 8 is a longitudinal vertical sectional view, partly broken away, of the muffler shown in Fig. 7, the section being on the line 8—8 of Fig. 7.

Figs. 6, 7 and 8 disclose a further modification of the catalytic unit which has a single central supporting member or base 29 with a multiplicity of catalytic elements 30 projecting from both sides thereof. Elements 30 may be integral with supporting member 29, but in its preferred construction the latter has apertures or perforations $b$ and catalytic elements 30 extend through such apertures to project on either side of supporting member 29 to an equal extent. A container 31 in which units 29–30 are to be mounted is illustrated in Figs. 7 and 8 and comprises an elongate, rectangular casing provided at its ends with lateral flanges 32 to which are secured end plates 33 in suitable manner, as by bolts 34. End plates 33 are formed with integral central conduits 35 for the ingress and egress of fluids. In cross section, container 31 is uniformly square or rectangular save for guide grooves in two of its opposing walls formed by outwardly pressed portions 37 forming opposing shoulders 38 (Fig. 7) between which are slidably received and guided the edges of central supporting members or discs 29 of the catalytic units, so that the catalytic elements 30 extending therefrom substantially span the interior of the container. Supporting members 29 will be in alignment within container or casing 31 and will serve to divide the interior longitudinally and centrally into two chambers. In order to provide access to, from and between these chambers U-shaped spacer members 40 are slidably seated in the guide grooves formed by portions 37 of the casing at the extreme ends of the latter, the open or recessed portion of each U member being directed toward conduit 35 at each end of the casing as indicated in Fig. 8. If casing 31 is very long it may be desirable to provide for intercommunication between the chambers formed therein by the catalyst units, as between adjacent units. In such case a spacer 41 (Fig. 8), having an elongate opening 42 therein, may be provided to fit in the guide grooves formed by portions 37 of the casing. As in the other forms of the unit, catalyst elements 30 of units 29–30 are of tear drop or streamlined design for passage of fluids without back pressure through container 31 in the direction indicated by the arrows in inlet and outlet conduits 35 (Fig. 8).

The catalytic units may be made in any desired size. The supporting members or plates 9 or 29 are by preference rectangular in shape for convenience in mounting in multiple in reaction chambers or containers. Such supporting members are by preference formed of ceramic material such as porcelain having little or no porosity. However they may be formed of metal, either cast or plates, in which case the metal should be calorized or coated with a porcelain enamel. The catalytic elements 10, 10a, 10b or 30, are formed of porcelaneous material of low porosity, as in the range of about 5% to about 18% porosity, which are heated into the temperature range of 2300° to 3900° F. to make them tough, dense, hard and stable both physically and chemically as well as highly resistant to temperature changes and shocks. Porcelaneous material of the type used for the cores of spark plugs is suitable.

Catalytic materials may be incorporated in and on such elements in any known or suitable manner as by dipping, immersing, spraying, etc. prior to or after assembly of the unit. The choice of catalytic material is very wide and is dependent upon the reaction desired. For example, for catalytic oxidizing reactions, such as oxidation of CO to $CO_2$, as in cleaning and rendering harmless the exhaust fumes of internal combustion engines, a base film of active alumina or the like is first applied to the catalytic elements and such base film is then impregnated with platinum, or silver, or copper, etc.; for oxidation of $SO_2$ to $SO_3$, platinum or vanadium oxide should be deposited on a base film of alumina; for synthesis of methane by the reaction of $CO + 3H_2 = CH_4 + H_2O$, cobalt or nickel should be added to the base film of active alumina or the like. To promote a hydrogenation reaction, such as the hydrogenation of fats, a nickel catalyst on a base film of active alumina can be used. The catalytic units herein disclosed may also be employed for promoting many other reactions such as synthesis of alcohol, hydrogenation of fuels, oxidation of acetylene to acetone, destructive hydrogenation of mineral oils, desulphurization, chlorination, etc., and still others which will be apparent to those skilled in catalysis.

The catalytic units of the present invention have been herein illustrated and described in a variety of forms and in connection with types of containers intended for straight through movements of fluids. It is to be understood however that the invention is not restricted to the specific features and details of the illustrated forms and mode of use but covers all changes, modifications and adaptations within the scope of the appended claims.

I claim as my invention:

1. Apparatus for carrying out catalytic reactions comprising an elongated outside container having an inlet and an outlet to permit the passage of fluids therethrough, said container housing removable catalytic units disposed therein in the path of fluids flowing through the container, each of said units comprising a substantially flat plate-like member having a plurality of rows of rod-like elements extending therefrom, said rows of rod-like elements occupying the major portion of said plate-like member but being arranged so as to leave free marginal portions around the periphery thereof, said rod-like elements being individually supported by said plate-like member out of contact with one another and each providing a surface of catalytic material exposed to the fluid flowing through the unit, successive rows of said elements being arranged in staggered relation to one another to insure efficient contact thereof with said fluid, said container being provided with channels extending longitudinally thereof for slidably receiving the free marginal portions of said plate-like members so as to thereby removably support said catalytic units in said container with said rod-like elements extending transversely thereof, and leaving one end of each rod-like element unsupported and thus permitting said rod-like elements to elongate and shorten freely in response to fluctuating temperatures.

2. Apparatus for carrying out catalytic reactions comprising an elongated outside container having an inlet and an outlet to permit the passage of fluids therethrough, said container housing removable catalytic units disposed therein in the path of fluids flowing through the container, each of said units comprising a substantially flat plate-like member having a plurality of rows of rod-like elements extending from one side thereof, said rows of rod-like elements occupying the major portion of the face of said plate-like member but being arranged so as to leave free marginal portions around the periphery thereof, said rod-like elements being individually supported by said plate-like member out of contact with one another and each providing a surface of catalytic material exposed to the fluid flowing through the unit, successive rows of said elements being arranged in staggered relation to one another to insure efficient contact thereof with said fluid, said container being provided with sets of channels disposed oppositely of one another adjacent the walls of said container and extending longitudinally thereof, said channels slidably receiving the free marginal portions of said plate-like members so as to thereby removably support said catalytic units in said container, pairs of said units being thus removably supported in said container opposite of one another with the corresponding rod-like members of each unit extending toward one another but with sufficient separation between the ends of corresponding elements to permit them to elongate and shorten independently without contact with one another in response to fluctuating temperatures, said rod-like elements being of varying length whereby end-to-end separations between the elements of oppositely disposed units occur at varying points across the width of said container thereby insuring an even flow of fluid through said units and thorough contact of said fluid with the surfaces of said rod-like elements.

3. Apparatus for carrying out catalytic reaction comprising an elongated outside container having an inlet and an outlet to permit the passage of fluids therethrough, said container housing removable catalytic units disposed therein in the path of fluids flowing through the container, each of said units comprising a substantially flat plate-like member having a plurality of rows of rod-like elements extending from both sides thereof, said rows of rod-like elements occupying the major portion of the face of said plate-like member but being arranged so as to leave free marginal portions around the periphery thereof, successive rows of said elements being arranged in staggered relation to one another to insure efficient contact thereof with said fluid, said container being provided with oppositely disposed longitudinal grooves for slidably receiving and retaining the free marginal portions of said plate-like members, said longitudinal grooves being so disposed that when said units are in place in said container said rod-like elements extend across said container from both sides of said plate-like members and substantially span said container transversely, each of said units being supported in said container solely through the agency of said plate-like members and said longitudinal channels thus leaving one end of each of said rod-like elements unsupported and thus free to elongate and shorten freely in response to fluctuating temperatures.

References Cited in the file of this patent

UNITED STATES PATENTS

| | | |
|---|---|---|
| 1,043,580 | Eldred | Nov. 5, 1912 |
| 1,351,859 | Lowe et al. | Sept. 7, 1920 |
| 1,452,145 | Cederberg | Apr. 17, 1923 |
| 1,722,339 | Pauling | July 30, 1929 |
| 1,919,626 | Finn, Jr. | July 25, 1933 |
| 1,989,774 | Snow | Feb. 5, 1935 |
| 2,288,943 | Eastman | July 7, 1942 |

FOREIGN PATENTS

| | | |
|---|---|---|
| 360,366 | Great Britain | Nov. 2, 1931 |
| 411,655 | Great Britain | June 14, 1934 |
| 413,967 | Great Britain | July 26, 1934 |